Oct. 20, 1936.                E. R. CREAMER                2,057,881
CORD FASTENING
Filed June 15, 1935
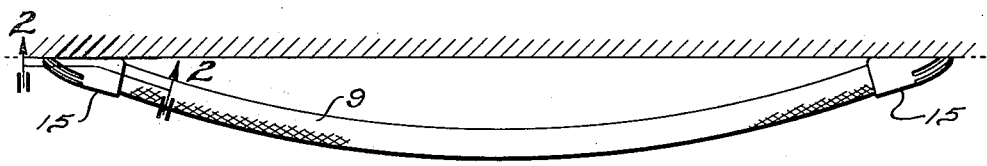
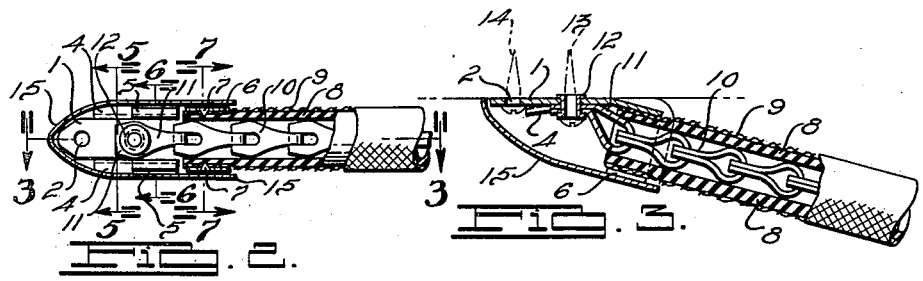
INVENTOR.
Edgar R. Creamer.
BY
ATTORNEY.

Patented Oct. 20, 1936

2,057,881

UNITED STATES PATENT OFFICE 2,057,881

CORD FASTENING

Edgar R. Creamer, Detroit, Mich.

Application June 15, 1935, Serial No. 26,845

7 Claims. (Cl. 105—354)

REISSUED
JUL 23 1940

This invention relates to cord fastenings and the object of the invention is to provide a fastening for a robe rail cord, pull cord, or the like, where it is desired to provide a firm fastening having a neat exterior appearance.

Another object of the invention is to provide a cord fastening including a cord comprising a rubber tube provided with a fabric cover and having a chain through the center in which the chain together with the rubber tube and fabric are secured in an attaching bracket and the bracket is provided with a cover to conceal the fastening and end of the cord.

A further object of the invention is to provide a bracket to which the chain is secured at one point and the fabric covering and rubber tube are secured at another point in the bracket, the bracket being provided with a slide cover to enclose the bracket and cover the chain and cord end.

Another object of the invention is to provide a means for locking the cover onto the bracket so that it cannot be readily displaced.

These objects and the several novel features of the invention are hereinafter more fully described and claimed and the preferred form of construction by which these objects are attained is shown in the accompanying drawing in which—

Fig. 1 is a plan view of a robe rail equipped with my improved cord fastening.

Fig. 2 is an enlarged section taken on line 2—2 of Fig. 1.

Fig. 3 is a section taken on line 3—3 of Fig. 2.

Fig. 4 is a section similar to Fig. 3 showing the fastening bracket in elevation.

Fig. 5 is an enlarged section taken on line 5—5 of Fig. 2.

Fig. 6 is an enlarged section taken on line 6—6 of Fig. 2.

Fig. 7 is an enlarged section taken on line 7—7 of Fig. 2.

Fig. 8 is a perspective view of the bracket cover.

Fig. 9 is a perspective view of the fastening bracket.

The fastening bracket is shown more particularly in Fig. 9 and comprises a sheet metal member 1 having apertures 2 and 3 punched therethrough. This bracket 1 is formed to provide a pair of angular lugs 4 at opposite sides and coextensive with the angular lugs 4 are a pair of lugs 5 which extend parallel with the plane of the bracket portion 1 while the lugs 4 extend at a slight angle thereto. The bracket portion 1 terminates in a semi-circular C-shaped portion 6 having punched out lugs 7 and these lugs 7 are shown more particularly in Figs. 4 and 7. The robe rail comprises a rubber tube 8 shown more particularly in Figs. 2, 3, and 7 and this rubber tube is covered with a fabric cover 9 as shown in Figs. 2, 3, 4, and 7. A chain 10 extends through the tube 8 and the end link 11 of this chain is provided with an eye and a metal grommet is fitted through the eye in the link 11 and through the aperture 3 in the bracket 1 so that the chain is firmly assembled with the bracket for shipment. With the chain in the position shown in Fig. 3 the end of the rubber tube 8 and fabric cover 9 fits within the semi-circular portion 6 and the lugs 7 of this portion 6 are pressed through the fabric cover 9 and into the tube 8 as shown in Figs. 2, 4, and 7 to firmly secure the tube in the member 6 and the member 6 is pinched down tight onto the tube to hold the tube and fabric cover in position. The bracket is fastened to the back of a seat or door frame or in other suitable position by inserting a screw 13 through the metal grommet 12 and a screw 14 through the bracket aperture 2 as shown in Fig. 3. This firmly secures the bracket in place.

In order to conceal the bracket, a cover member 15 is provided, as shown more particularly in Fig. 8. This cover member 15 is provided with two inturned lugs 16 and these lugs may be engaged beneath the lugs 4 of the fastening bracket 1 and by moving the member 15 longitudinally the lugs 16 may be moved past the lugs 4 and into engagement beneath the lugs 5, as shown in Fig. 6. When these lugs 16 move past the lugs 4 the lugs 16 engage behind the low ends 17 of the lugs 4, as will be understood from Fig. 9. Also, as will be understood from Fig. 4, these lugs 16 in springing up under the lugs 5 also engage behind the shoulders 18 on the bracket and thus the cover 15 is locked from longitudinal movement in either direction and the lugs 16 prevent the possibility of pulling the cover off from the bracket. This cover 15 extends beyond the portion 6 of the fastening bracket as will be understood from Figs. 2, 3, and 4 and thus conceals the entire fastening means and end of the cord so that the completed robe rail will appear as shown in Fig. 1. This invention, however, is not limited to use with robe rails but may be used with pull cords, assist cords or at any other place where it is desired to fasten a cord of this type securely and conceal the securing means.

From the foregoing description it becomes evident that the device is very simple and efficient in operation, provides a complete assembled unit for shipment, will anchor the cord firmly in place and provides a means for concealing the securing bracket.

Having thus fully described my invention, its utility and mode of operation, what I claim and desire to secure by Letters Patent of the United States is—

1. A cord fastening for use with cords having a hollow center provided with a chain extending therethrough, comprising a bracket having a pair of apertures therein, a metal grommet extending through one link of the chain and one of said apertures, the grommet and other aperture being arranged to receive securing screws therethrough, a C-shaped clamp portion at one end of the bracket, the end of the cord being secured in the C-shaped clamp portion, a pair of lugs on each side of the bracket, a cover for the bracket provided with a pair of lugs, the cover member being engageable over the bracket with the lugs on the cover engaging beneath the first pair of lugs on the bracket, the arrangement being such that as the lugs of the cover are moved past the first pair of lugs of the bracket said cover lugs spring into locking engagement beneath the second pair of lugs on the bracket.

2. A fastening for a tubular cord member having a chain extending through the center, comprising a bracket to which the chain is secured, the bracket being provided with a clamp portion engaging about the end of the cord member and securing the same to the bracket, a series of lugs on opposite sides of the bracket arranged in two pairs and a cover slidable over the bracket and provided with a pair of lugs, the lugs of the cover engaging beneath the first pair of lugs of the bracket and the first pair of lugs being arranged to guide the lugs of the cover into engagement beneath the second pair of lugs as the cover is moved longitudinally in one direction, the lugs of the cover when engaged beneath the second pair of lugs of the bracket being prevented from movement in one direction by said first pair of lugs of the bracket and being prevented from movement in the opposite direction by the clamp portion of the bracket.

3. A fastening for a tubular cord member having a chain extending through the center, comprising a bracket to which the chain is secured, said bracket being provided with a C-shaped clamp portion engaging about the end of the cord, a series of lugs extending inwardly from the C-shaped clamp portion and engaging in the cord to secure the same to the bracket independently of the chain and a cover member slidable over the bracket and connected to the same to conceal the bracket and C-shaped clamp portion.

4. A fastening for a tubular cord member having a chain extending through the center, comprising a bracket arranged to be secured to a surface, the securing means extending through the chain and bracket, a C-shaped clamp portion at one end of the bracket secured about the end of the tubular cord member and a cover member adapted for slidable engagement with the bracket, said cover member concealing the bracket and C-shaped clamp member and being arranged for locking engagement with the bracket.

5. A fastening for a tubular cord member having a chain extending through the center, comprising a bracket to which the chain is secured, said bracket being provided with a portion engaging about the end of the cord and securing the same to the bracket independently of the chain and a cover member fitting over the bracket and covering the bracket and bracket portion in which the tubular cord member is secured.

6. A cord fastening for use with cords having a hollow center provided with a chain extending therethrough, comprising a bracket to which the chain is secured, the bracket being provided with a portion to which the cord is secured independently of the chain, a cover for the bracket, the bracket being provided with lugs and the cover being provided with companion lugs engaging beneath the lugs of the bracket.

7. A fastening for a tubular cord member having a chain extending through the center, comprising a bracket having a pair of apertures therein, a metal grommet extending through one link of the chain and one of said apertures to secure the chain to the bracket, the grommet and other aperture being arranged to receive securing screws therethrough, a C-shaped clamp member at one end of the bracket and extending about the cord member to secure the cord to the bracket independently of the chain, the C-shaped clamp member having inturned lugs engaging in the cord member.

EDGAR R. CREAMER.